US012594650B2

(12) United States Patent
Lin

(10) Patent No.: US 12,594,650 B2
(45) Date of Patent: Apr. 7, 2026

(54) MINI TORQUE WRENCH

(71) Applicant: TORQUE-TECH PRECISION CO., LTD., Taichung (TW)

(72) Inventor: Tien-Lung Lin, Taichung (TW)

(73) Assignee: TORQUE-TECH PRECISION CO., LTD., Taichung (TW)

( * ) Notice: Subject to any disclaimer, the term of this patent is extended or adjusted under 35 U.S.C. 154(b) by 416 days.

(21) Appl. No.: 18/488,568

(22) Filed: Oct. 17, 2023

(65) Prior Publication Data

US 2024/0131665 A1 Apr. 25, 2024
US 2024/0227136 A9 Jul. 11, 2024

(30) Foreign Application Priority Data

Oct. 21, 2022 (TW) ................................ 111140014

(51) Int. Cl.
*B25B 23/142* (2006.01)

(52) U.S. Cl.
CPC ................................ *B25B 23/1427* (2013.01)

(58) Field of Classification Search
CPC ......... B25B 13/02; B25B 13/06; B25B 13/46; B25B 13/463; B25B 13/48; B25B 21/002; B25B 21/004; B25B 23/0021; B25B 23/0035; B25B 23/02; B25B 23/007; B25B 23/08; B25B 23/14; B25B 23/141; B25B 23/142; B25B 23/1427; B25B 23/16; B25G 1/063
See application file for complete search history.

(56) References Cited

U.S. PATENT DOCUMENTS 5,129,293 A * 7/1992 Larson ................ B25B 23/1427 81/478
7,044,036 B1 5/2006 Salazar et al.
11,338,417 B2 * 5/2022 Hsieh .................... B25B 23/141

FOREIGN PATENT DOCUMENTS

| | | | |
|---|---|---|---|
| CN | 105818089 | A | 8/2016 |
| TW | 266530 | U | 12/1995 |
| TW | 370915 | U | 9/1999 |
| TW | I334814 | B | 12/2010 |
| TW | M407131 | U1 | 7/2011 |
| TW | I549785 | B | 9/2016 |
| TW | I671165 | B | 9/2019 |
| TW | I701110 | B | 8/2020 |
| TW | I729844 | * | 6/2021 |
| TW | I744812 | B | 11/2021 |
| TW | I769812 | B | 7/2022 |
| TW | I776684 | B | 9/2022 |

* cited by examiner

*Primary Examiner* — Robert J Scruggs
(74) *Attorney, Agent, or Firm* — Sinorica International Patent & Trademark

(57) ABSTRACT

A mini torque wrench has a tubular body. A rod body is pivotally connected to one end of the tubular body. The rod body is further connected to a trip mechanism. The trip mechanism is connected to an elastic member. An adjustment unit is disposed on the other end of the tubular body. The adjustment unit is connected to an operating member. When the operating member drives the adjustment unit to adjust the elastic force of the elastic member, the overall length of the mini torque wrench will not change, so as to keep the advantage of miniaturization of the mini torque wrench.

10 Claims, 6 Drawing Sheets

MINI TORQUE WRENCH

FIELD OF THE INVENTION

The present invention relates to a mini torque wrench, and more particularly to a torque wrench that is small in size.

BACKGROUND OF THE INVENTION

A conventional torque wrench has a tubular body. A rod body is pivotally connected to one end of the tubular body. The rod body is connected to a trip mechanism. The trip mechanism is connected to an elastic member. The elastic member is connected to an adjustment unit. In general, the adjustment structure uses a screw to move back and forth along the tubular body for adjusting the elastic force of the elastic member against the trip mechanism, so as to change the threshold of the trip mechanism. However, this adjustment will increase the overall length of the torque wrench, which is not conducive to miniaturization of the torque wrench and will affect operability and portability. In addition, the conventional torque wrench adjusts the preset torque value in a single adjustment manner, and the torque value cannot be slightly adjusted any further.

SUMMARY OF THE INVENTION

The primary object of the present invention is to provide a mini torque wrench, which adjusts to the torque value without changing the overall length therefore possessing the advantage of miniaturization of the mini torque wrench.

In order to achieve the foregoing object, the mini torque wrench provided by the present invention comprises a tubular body. A rod body is pivotally connected to one end of the tubular body. One end of the rod body extends out of the tubular body and has a head. The other end of the rod body is inserted into the tubular body and has a force-receiving portion. A trip mechanism is provided in the tubular body adjacent to the force-receiving portion. An elastic member is provided on the other end of the trip mechanism opposite to the force-receiving portion. An adjustment unit is disposed on the other end of the tubular body. The adjustment unit includes a sliding member that is movable in an axial direction of the tubular body to push the elastic member and a rotating member that is rotatably disposed on the tubular body. The sliding member and the rotating member are connected by means of threads. An operating member is rotatably provided on the periphery of the adjustment unit. The operating member is connected to the rotating member. The sliding member has a fine adjustment passageway extending in the axial direction of the tubular body. A sliding pin is movably provided in the fine adjustment passageway. The sliding pin is connected to a driving member. The driving member may be driven by an external force to push the sliding pin, so that the sliding pin moves axially in the fine adjustment passageway and pushes the elastic member.

In the mini torque wrench provided by the present invention, the user can rotate the rotating member through the operating member to drive the sliding member to move in the axial direction the tubular body for adjusting the elastic force of the elastic member against the trip mechanism, thereby adjusting the preset torque value of the mini torque wrench. By driving the driving member, the sliding pin is driven to move axially in the fine adjustment passageway so that the elastic force of the elastic member is slightly adjusted, so as to slightly adjust the preset torque value. No matter when the torque of the mini torque wrench is adjusted or slightly adjusted, the adjustment mechanism of the adjustment unit will keep the overall length of the mini torque wrench from changing.

DETAILED DESCRIPTION OF THE PREFERRED EMBODIMENTS

Embodiments of the present invention will now be described, by way of example only, with reference to the accompanying drawings.

Figure 1:
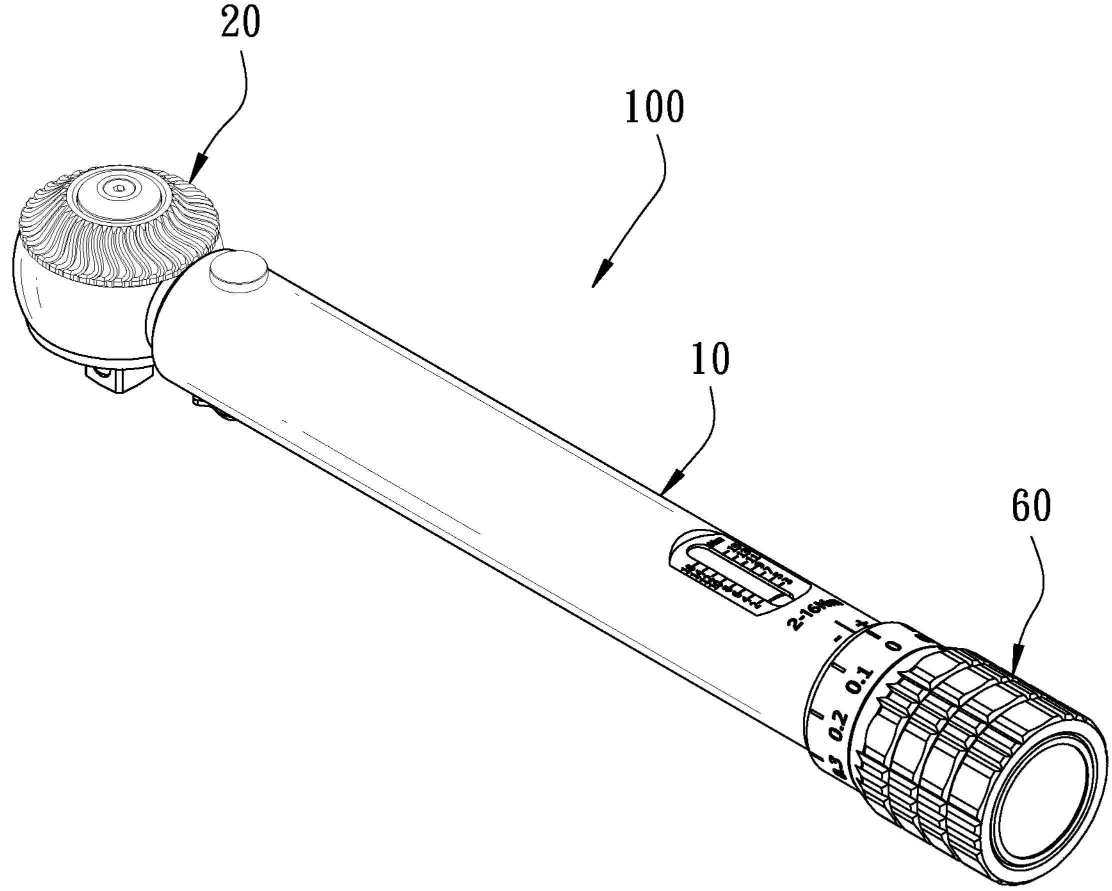
FIG. 1 is a perspective view in accordance with a preferred embodiment of the present invention.
Figure 2:
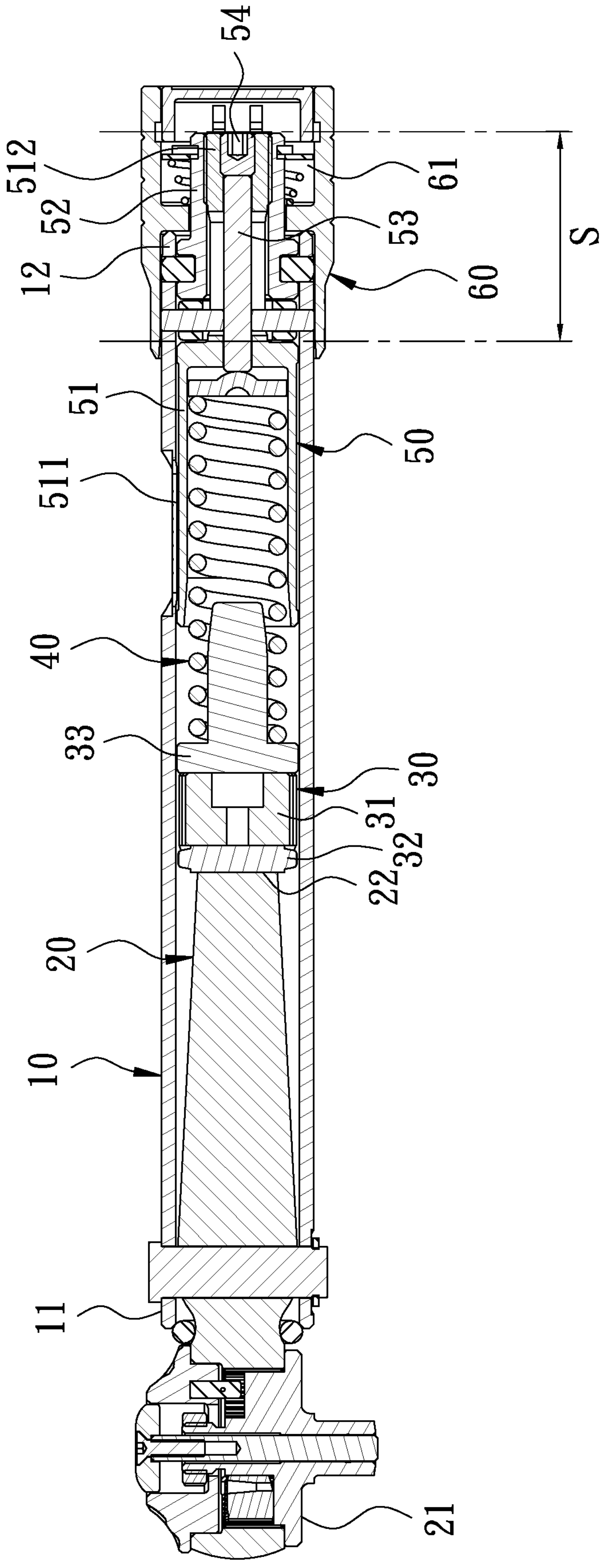
FIG. 2 is an exploded view in accordance with the preferred embodiment of the present invention.

FIG. 1 is a perspective view in accordance with a preferred embodiment of the present invention. FIG. 2 is a cross-sectional view in accordance with the preferred embodiment of the present invention. The present invention discloses a mini torque wrench 100. The mini torque wrench 100 comprises a tubular body 10. The tubular body 10 has a first end 11 and a second end 12 opposite to the first end 11. A rod body 20 is pivotally connected to the first end 11. One end of the rod body 20 extends out of the tubular body 10 and has a head 21. The other end of the rod body 20 is inserted into the first end 11 and has a force-receiving portion 22. A trip mechanism 30 is provided in the tubular body 10 adjacent to the force-receiving portion 22. An elastic member 40 is provided at the other end of the trip mechanism 30, opposite to the force-receiving portion 22. The elastic member 40 is configured to exert an elastic force to push the trip mechanism 30 against the force-receiving portion 22 so that the trip mechanism 30 possesses a preset torque value. The trip mechanism 30 generally includes a holding member 31 and a roller 32 located between the holding member 31 and the force-receiving portion 22. Preferably, a spring seat 33 is provided between the holding member 31 and the elastic member 40. The principle of the trip mechanism 30 is well known in the art and will not be described here. In addition, an adjustment unit 50 and an operating member 60 are provided at the second end 12 of the tubular body 10. The operating member 60 is axially movable and is rotatably disposed on the periphery of the adjustment unit 50 for adjusting the elastic force of the elastic member 40.

Figure 3:
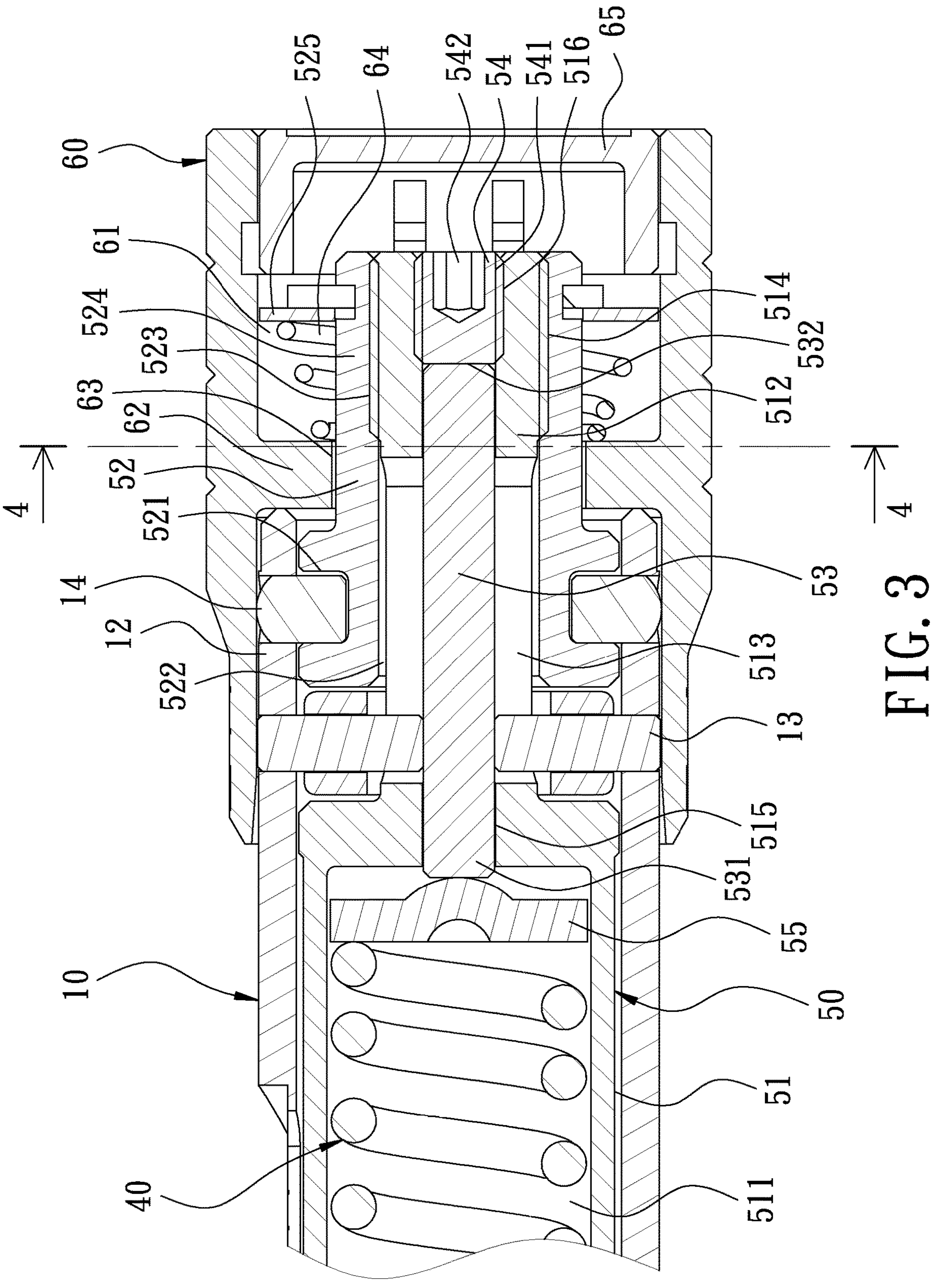
FIG. 3 is a partial enlarged view in accordance with the preferred embodiment of the present invention.

FIG. 3 is a partial enlarged view in accordance with the preferred embodiment of the present invention. The adjustment unit 50 has a sliding member 51, a rotating member 52, a sliding pin 53, a driving member 54, and a force-increasing member 55.

The sliding member 51 is disposed in the tubular body 10. The sliding member 51 has an accommodating portion 511 that axially covers the elastic member 40 and a coupling portion 512 that extends axially from one side of the accommodating portion 511. The coupling portion 512 has at least one restricting elongate hole 513 extending in the axial direction of the tubular body 10. The tubular body 10 has at least one restricting portion 13. The restricting portion 13 is confined in the restricting elongate hole 513 so that the sliding member 51 only moves in the axial direction of the tubular body 10. In addition, the periphery of the coupling portion 512 has an external thread 514. A fine adjustment passageway 515 is disposed between the accommodating portion 511 and the coupling portion 512 in the axial direction of the tubular body 10. The inner wall of the fine adjustment passageway 515 has a first thread 516.

The rotating member 52 is disposed at the second end 12 of the tubular body 10. The rotating member 52 has at least one annular positioning groove 521. The tubular body 10 has at least one positioning portion 14. The positioning portion 14 is inserted in the annular positioning groove 521 so that the rotating member 52 is rotatable relative to the tubular body 10. The rotating member 52 has a through hole 522 corresponding to the coupling portion 512. The inner wall of the through hole 522 is formed with an internal thread 523 for threaded engagement of the external thread 514. When the rotating member 52 is rotated, the rotating member 52 screws the sliding member 51 to move in the axial direction of the tubular body 10 and push the elastic member 40 to adjust the elastic force of the elastic member 40.

The sliding pin 53 is movable in the fine adjustment passageway 515. The sliding pin 53 has a front end 531 facing the elastic member 40 and a rear end 532 opposite to the front end 531. The front end 531 partially extends into the accommodating portion 511 via the fine adjustment passageway 515.

The driving member 54 is disposed in the fine adjustment passageway 515. The driving member 54 has a second thread 541. The second thread 541 is screwed to the first thread 516 so that the driving member 54 is rotatable and moves axially in the fine adjustment passageway 515. One side of the driving member 54 is against the rear end 532 of the sliding pin 53. The other side of the driving member 54 has an operating portion 542, such as a polygonal hole. The operating portion 542 is driven by an external force to drive the driving member 54 to push the sliding pin 53, so that the sliding pin 53 moves in the axial direction of the fine adjustment passageway 515 and pushes the elastic member 40 for fine-tuning the elastic force of the elastic member 40. The fine adjustment passageway 515 has an axial length. The total axial length of the sliding pin 53 and the driving member 54 is greater than the axial length of the fine adjustment passageway 515.

The force-increasing member 55 is disposed between the elastic member 40 and the front end 531 of the sliding pin 53. When the rotating member 52 screws the sliding member 51 to move in the axial direction of the tubular body 10 for adjusting the elastic force of the elastic member 40, the distance between the force-increasing member 55 and the coupling portion 512 remains unchanged. When the sliding pin 53 moves axially in the fine adjustment passageway 515 for fine-tuning the elastic force of the elastic member 40, the force-increasing member 55 is axially pushed by the sliding pin 53 to be close to or away from the coupling portion 512.

Figure 4:
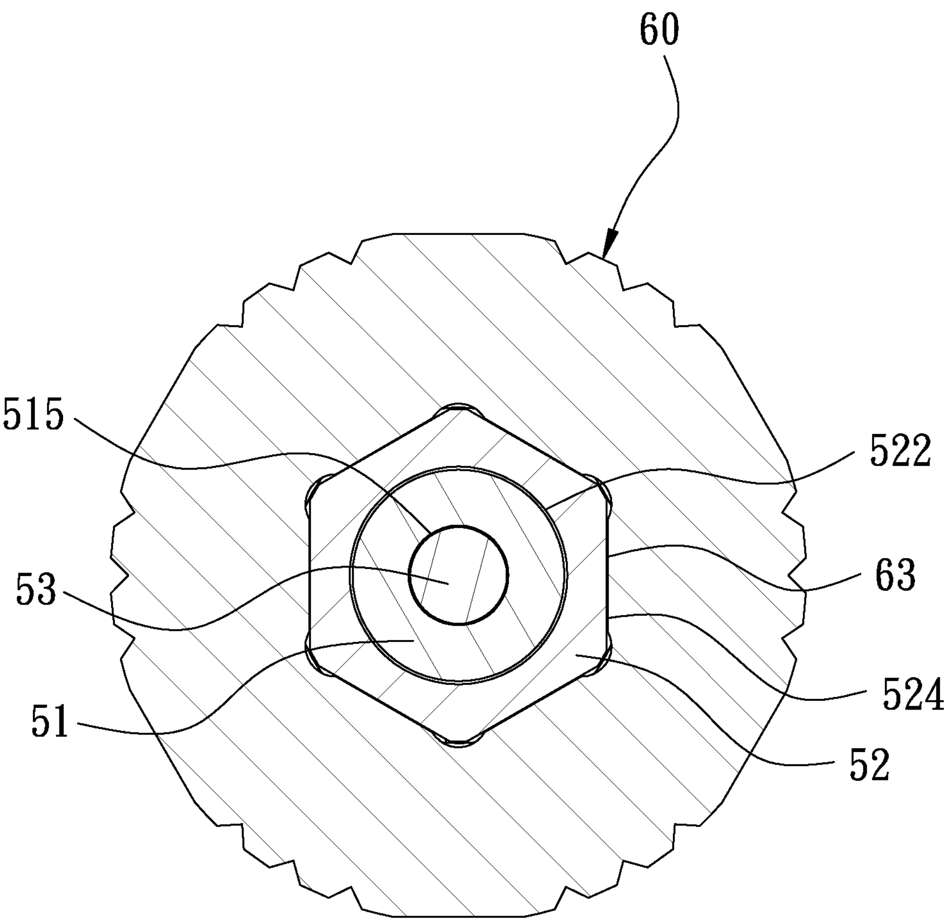
FIG. 4 is a cross-sectional view taken along line 4-4 of FIG. 3.

FIG. 4 is a cross-sectional view taken along line 4-4 of FIG. 3. As shown in FIG. 3 and FIG. 4, the operating member 60 has a perforation 61. An annular flange 62 is provided on the inner wall of the perforation 61. The center of the annular flange 62 has a first engaging portion 63. The rotating member 52 has a second engaging portion 524 corresponding to the first engaging portion 63. The second engaging portion 524 is engaged with the first engaging portion 63. When the operating member 60 is rotated, the operating member 60 drives the second engaging portion 524 through the first engaging portion 63 to rotate the rotating member 52. In this embodiment, the first engaging portion 63 is a polygonal hole, and the second engaging portion 524 is a polygonal surface corresponding to the polygonal hole. In addition, the rotating member 52 further has a stopper 525. A push spring 64 is provided between the stopper 525 and the annular flange 62. A cover 65 is detachably connected to the outside of the perforation 61.

Figure 5:
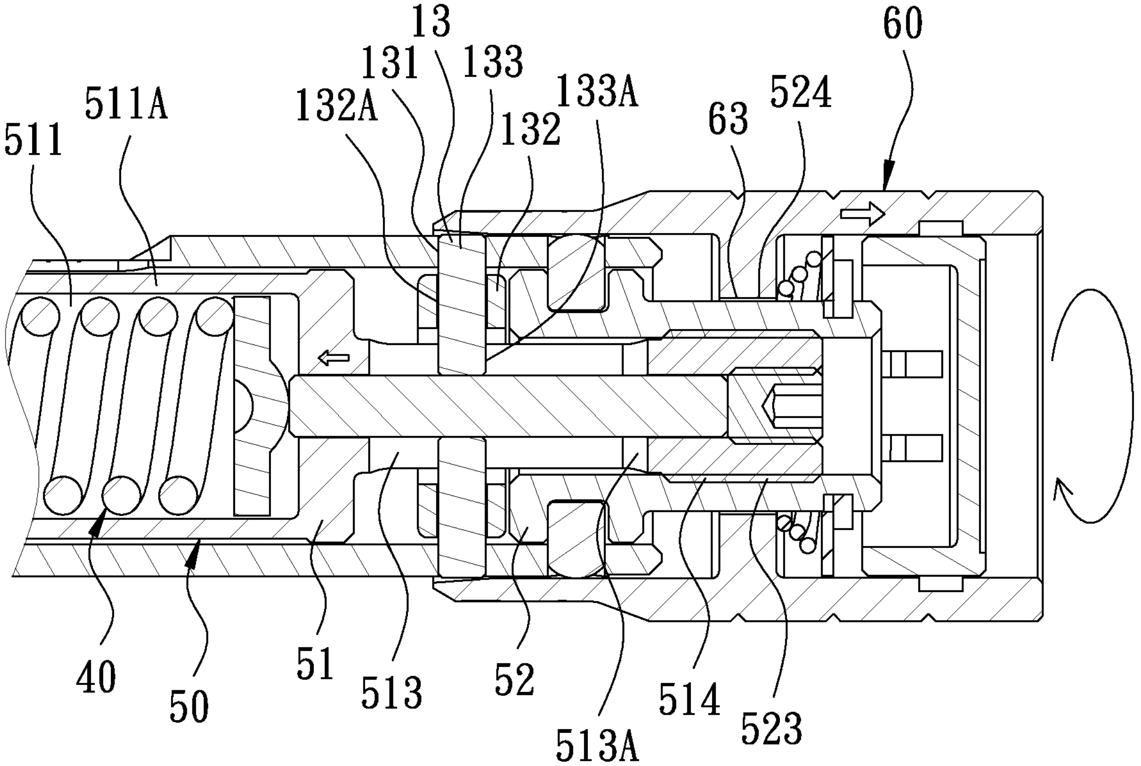
FIG. 5 is a schematic view of the preferred embodiment of the present invention when in use, illustrating that the preset torque value is adjusted.

FIG. 5 is a schematic view of the preferred embodiment of the present invention when in use, illustrating that the preset torque value is adjusted. When the user pulls the tubular body 10, the acting force of the tubular body 10 will be transmitted to the rod body 20 via the trip mechanism 30, and a workpiece is driven to rotate by the head 21. When the acting force reaches a preset torque value, the trip mechanism 30 will trip and make a sound to warn the user. When the user intends to adjust the preset torque value, the operating member 60 is pulled backward to make the first engaging portion 63 engage with the second engaging portion 524. By rotating the operating member 60 to rotate the rotating member 52, the rotating member 52 drives the sliding member 51 to move in the axial direction of the tubular body 10 by means of the internal thread 523 to screw the external thread 514 for changing the elastic force of the elastic member 40 against the trip mechanism 30, so that adjusting the preset torque value can be achieved.

It is worth mentioning that in this embodiment, the accommodating portion 511 is an accommodating groove and has an annular inner wall 511A. The annular inner wall 511A covers the elastic member 40 in the axial direction so that the elastic member 40 does not come into contact with the inner periphery of the tubular body 10 to protect the tubular body 10 from damage.

It is worth mentioning that the restricting elongate hole 513 communicates with the fine adjustment passageway 515 and exposes the sliding pin 53. The inner wall of the restricting elongate hole 513 has a contact surface 513A. The restricting portion 13 has a restricting hole 131 located in the tubular body 10 and a reinforcing ring 132 located between the accommodating portion 511 and the rotating member 52. The reinforcing ring 132 has a hole 132A communicating with the restricting hole 131 and the restricting elongate hole 513. The restricting portion 13 further has a restricting pin 133. One end of the restricting pin 133 is inserted in the restricting hole 131. The other end of the restricting pin 133 passes through the hole 132A and the restricting elongate hole 513 to be in contact with the sliding pin 53. In this way, the reinforcing ring 132 can be used to achieve the effect of stabilizing the restricting pin 133. One side of the restricting pin 133 has a stop surface 133A. When the sliding member 51 is axially displaced to a specific position toward the head 21, the contact surface 513A of the restricting elongate hole 513 is blocked by the stop surface 133A, so that the sliding member 51 no longer moves toward the head 21, which prevents the mini torque wrench 100 from being overloaded.

Figure 6:
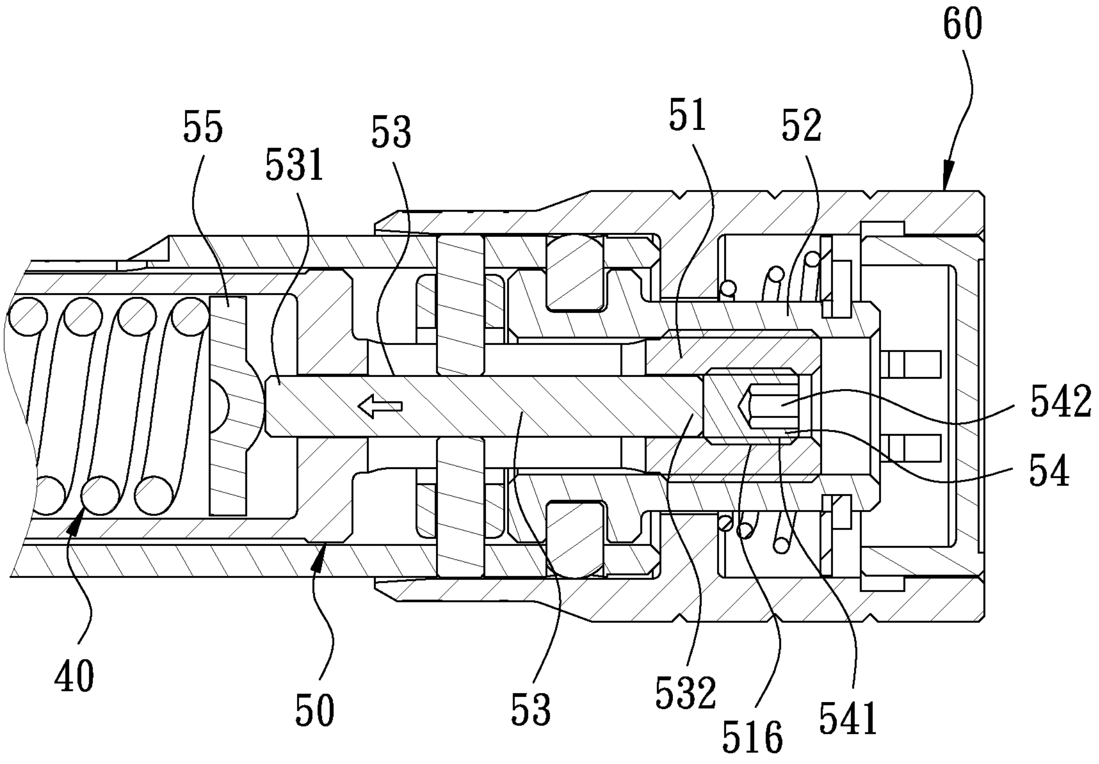
FIG. 6 is a schematic view of the preferred embodiment of the present invention when in use, illustrating that the preset torque value is slightly adjusted.

FIG. 6 is a schematic view of the preferred embodiment of the present invention when in use, illustrating that the preset torque value is fine-tuned. After the user adjusts the preset torque value via the adjustment unit 50, if the user intends to adjust the preset torque value more accurately, who can open the cover 65 and rotate the driving member 54 through the operating portion 542, such that the driving member 54 pushes the sliding pin 53 to move axially in the fine adjustment passageway 515 for the front end of the sliding pin 53 to push the force-increasing member 55 to slightly change the elastic force of the elastic member 40 against the trip mechanism 30. This allows the user to slightly adjust the preset torque value. It is worth mentioning that by rotating the driving member 54, the sliding pin 53 is driven to push the elastic member 40 in a sliding manner Thus, when the mini torque wrench 100 is in use, the reaction force of the elastic member 40 will not rotate the driving member 54, thereby ensuring that the preset torque value will not change. The elastic member 40 and the force-increasing member 55 are in surface contact with each other. When the torque is fine-tuned, the friction force between the elastic member 40 and the force-increasing member 55 can be reduced greatly, so as to solve the shortcomings of the conventional screw-type torque adjustment structure. The twisting force of the conventional screw-type torque adjustment structure will increase the friction greatly, which is not conducive to the user's operation.

Referring to FIG. 5 and FIG. 6, since the rotating member 52 is located in the perforation 61 of the operating member 60 and drives the sliding member 51 to slide in the axial direction of the tubular body 10 in a screwing manner for adjusting the preset torque value, and the sliding pin 53 slides axially in the fine adjustment passageway 515 on the sliding member 51 for fine-tuning the preset torque value. No matter when the torque of the mini torque wrench 100 is adjusted or fine-tuned, the adjustment mechanism of the adjustment unit 50 will keep the overall length of the mini torque wrench 100 from changing. In addition, referring to FIG. 2, the operating member 60 has a limited area S on the inner periphery of the perforation 61. The limited area S is defined between one side of the accommodating portion 511 of the sliding member 51 adjacent to the second end 12 and one side of the rotating member 52 away from the second end 12. When the preset torque value is the minimum, that is, the position shown in the figure, the coupling portion 512, the rotating member 52 and the driving member 54 of the adjustment unit 50 are located in the limited area S, and the sliding pin 53 is partially located in the limited area S. That is to say, the adjustment unit 50 is confined within the operating member 60. Therefore, the mini torque wrench 100 can be miniaturized, so as to facilitate the operation and portability for the user.

What is claimed is:

1. A mini torque wrench, comprising a tubular body, the tubular body having a first end and a second end opposite to the first end, a rod body being pivotally connected to the first end, one end of the rod body extending out of the tubular body and having a head, another end of the rod body being inserted into the first end and having a force-receiving portion, a trip mechanism being provided in the tubular body adjacent to the force-receiving portion, an elastic member being provided on another end of the trip mechanism opposite to the force-receiving portion, the elastic member being configured to exert an elastic force to push the trip mechanism against the force-receiving portion, the second end of the tubular body having an adjustment unit for adjusting the elastic force of the elastic member, an operating member being rotatably disposed on a periphery of the adjustment unit for operating the operating unit; characterized in that:

the adjustment unit includes a sliding member, a rotating member, a sliding pin and a driving member; wherein the sliding member is disposed in the tubular body and is movable in an axial direction of the tubular body, the sliding member has an accommodating portion, the accommodating portion axially covers the elastic member so that the elastic member is not in contact with an inner periphery of the tubular body, the sliding member further has a coupling portion extending axially from one side of the accommodating portion, a periphery of the coupling portion has an external thread, a fine adjustment passageway is disposed between the accommodating portion and the coupling portion in the axial direction of the tubular body;

the rotating member is rotatably disposed at the second end of the tubular body and connected to the operating member, the rotating member has a through hole corresponding to the coupling portion, an inner wall of the through hole has an internal thread for engagement with the external thread, when the rotating member is driven by the operating member, the rotating member screws the sliding member to move in the axial direction of the tubular body and push the elastic member to adjust the elastic force of the elastic member;

the sliding pin is movable in the fine adjustment passageway, the sliding pin has a front end facing the elastic member and a rear end opposite to the front end, the front end partially extends into the accommodating portion via the fine adjustment passageway;

the driving member is movable in the fine adjustment passageway, one side of the driving member is against the rear end of the sliding pin, another side of the driving member has an operating portion, the operating portion is driven by an external force to drive the driving member to push the sliding pin, so that the sliding pin moves axially in the fine adjustment passageway and pushes the elastic member for fine-tuning the elastic force of the elastic member.

2. The mini torque wrench as claimed in claim 1, wherein the coupling portion of the sliding member has at least one restricting elongate hole extending in the axial direction of the tubular body, the tubular body has at least one restricting portion, and the restricting portion is confined in the restricting elongate hole so that the sliding member only moves in the axial direction of the tubular body.

3. The mini torque wrench as claimed in claim 2, wherein an inner wall of the restricting elongate hole has a contact surface, the restricting portion has a restricting pin, and one side of the restricting pin has a stop surface, when the sliding member is axially displaced to a specific position toward the head, the contact surface of the restricting elongate hole is blocked by the stop surface so that the sliding member no longer moves toward the head.

4. The mini torque wrench as claimed in claim 2, wherein the restricting elongate hole communicates with the fine adjustment passageway and exposes the sliding pin, the restricting portion has a restricting hole located in the tubular body and a reinforcing ring located between the accommodating portion and the rotating member, the reinforcing ring has a hole communicating with the restricting hole and the restricting elongate hole, the restricting portion further has a restricting pin, one end of the restring pin is inserted in the restricting hole, and another end of the restricting pin passes through the hole and the restricting elongate hole to be in contact with the sliding pin.

5. The mini torque wrench as claimed in claim 1, wherein the rotating member has at least one annular positioning groove, the tubular body has at least one positioning portion, and the positioning portion is inserted in the annular positioning groove so that the rotating member is rotatable relative to the tubular body.

6. The mini torque wrench as claimed in claim 1, wherein an inner wall of the fine adjustment passageway has a first thread, the driving member has a second thread, and the second thread is screwed to the first thread so that the driving member is rotatable and moves axially in the fine adjustment passageway.

7. The mini torque wrench as claimed in claim 1, wherein the fine adjustment passageway has an axial length, and a total axial length of the sliding pin and the driving member is greater than the axial length of the fine adjustment passageway.

8. The mini torque wrench as claimed in claim 1, wherein the operating member has a perforation and is rotatably disposed outside the second end of the tubular body, a first engaging portion is provided on an inner wall of the perforation of the operating member, the rotating member has a second engaging portion corresponding to the first engaging portion, and the second engaging portion is engaged with the first engaging portion, when the operating member is rotated, the operating member drives the second engaging portion via the first engaging portion to rotate the rotating member.

9. The mini torque wrench as claimed in claim 1, wherein the adjustment unit further includes a force-increasing member, and the force-increasing member is disposed between the elastic member and the front end of the sliding pin, when the rotating member screws the sliding member to move in the axial direction of the tubular body for adjusting the elastic force of the elastic member, a distance between the force-increasing member and the coupling portion remains unchanged, when the sliding pin moves axially in the fine adjustment passageway for fine-tuning the elastic force of the elastic member, the force-increasing member is axially pushed by the sliding pin to be close to or away from the coupling portion.

10. The mini torque wrench as claimed in claim 1, wherein the operating member has a limited area on an inner periphery of the perforation, the limited area is defined between one side of the accommodating portion of the sliding member adjacent to the second end and one side of the rotating member away from the second end, when a preset torque value is minimum, the coupling portion, the rotating member and the driving member of the adjustment unit are located in the limited area, and the sliding pin is partially located in the limited area.

* * * * *